2,944,008
CONTROLLING HEAT FRONTS IN PLATINUM CATALYST HYDROFORMING

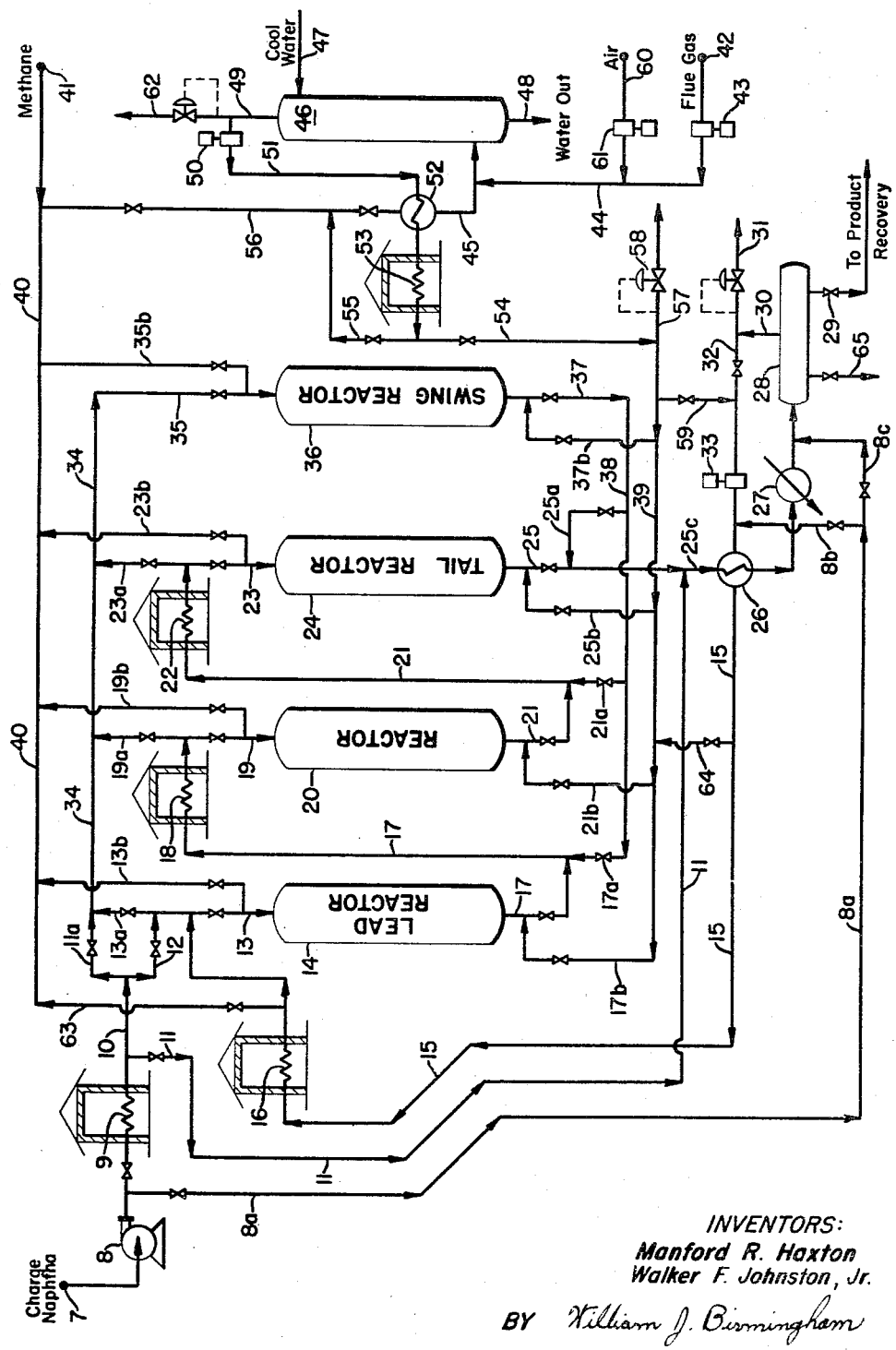

Manford R. Haxton, Texas City, and Walker F. Johnston, Jr., La Marque, Tex., assignors to The American Oil Company, Texas City, Tex., a corporation of Texas Filed May 31, 1957, Ser. No. 662,868

9 Claims. (Cl. 208—140)

This invention relates to a method of operating a platinum catalyst naphtha reforming system, and it pertains more particularly to a method for avoiding the formation of heat-fronts in the catalyst bed of a reactor which is being brought on-stream at reforming temperatures.

Platinum catalyst hydroforming systems present problems very different from those encountered in molybdenum systems. One particularly difficult problem has been the unexpected formation of heat-fronts or hot-spots which pass through a catalyst bed when new or freshly-regenerated platinum catalyst initially comes in contact with both hydrogen and hydrocarbons at reforming temperatures, e.g., 800° F. to 1000° F. This situation arises, for instance, when returning a bed of regenerated platinum catalyst to on-stream operation in a multiple fixed-bed system, as exemplified by ultraforming (Petroleum Engineer, vol. XXVI, No. 4, April 1954, at page C–35), and Powerforming (The Oil and Gas Journal, vol. 54, No. 46, March 19, 1956, at page 150).

Such systems include lead, intermediate and tail reactors, heating zones, a gas separation zone, and compressor and lines for recycling hydrogen-rich separated recycle gas. When catalyst in a particular reactor becomes substantially deactivated, that reactor is isolated and the catalyst regenerated while reforming continues in the remaining reactors. In such systems hydrogen-rich recycle gas and naphtha are already at reforming temperature when coming into contact with the regenerated catalyst. Two distinct heat-fronts may result. The first heat-front may begin when the hydrogen-rich recycle gas, which normally contains some hydrocarbons, initially contacts the catalyst. The second heat-front appears when the naphtha is subsequently introduced into the reactor. The resulting heat-fronts cause coke formation on the catalyst with consequent catalyst deactivation. In extreme cases, heat-fronts may also cause deactivation by changing the crystalline structure of the catalyst, e.g., from active gamma, chi, or eta alumina to inactive alpha alumina, particularly in the case of platinum-alumina catalysts containing halogen.

An object of this invention is to avoid the formation of heat-fronts when hydrogen-rich recycle gas comes in contact with new or regenerated platinum catalyst at reforming temperatures. Another object is to avoid the formation of heat-fronts when naphtha comes in contact with new or regenerated platinum catalyst in the presence of hydrogen at reforming temperatures. Another object is to avoid deactivation of new or fully-reactivated platinum catalysts in a reactor which is being returned to reforming operation in a multiple fixed-bed reactor system wherein naphtha is being simultaneously reformed in other reactors. Still another object of this invention is to permit the return to on-stream operation of a reactor containing regenerated-rejuvenated platinum catalyst without having to cool the catalyst bed or lower the temperature of the hydrogen-rich recycle gas and naphtha introduced therein below conventional reforming temperatures. These and other objects will be apparent as the detailed description of the invention proceeds.

To avoid damaging heat-fronts when bringing a reactor containing a highly-active platinum catalyst on-stream at reforming temperature, we introduce a special quench step after first introducing hydrogen-rich recycle gas into the reactor under controlled conditions. Thus, to bring a reactor on-stream in accordance with our invention, we first purge oxygen-containing gases therefrom with flue gas at a temperature of about 700–1000° F. When oxygen has been eliminated and temperature of the catalyst bed has been adjusted to reforming temperature, the reactor is purged at about atmospheric pressure with hydrogen-rich recycle gas for a period in excess of about 1 minute at a gas flow rate of about 1–25 standard cubic feet per hour per pound of platinum catalyst, preferably about 4–20 standard cubic feet per hour per pound of catalyst. We then purge the hydrogen-rich recycle gas with our quench gas, i.e., a hydrocracking-resistant gas, following which hydrogen-rich purge gas is again introduced, the reactor is pressured-up to about reforming pressure, and naphtha is introduced. Introduction of our special quench step, as above described, substantially eliminates hot spots before any significant catalyst deactivation occurs.

With platinum-alumina catalyst beds of substantial depth, e.g., about 6 inches or more, we prefer to repeat our quench step once or more times until no appreciable heat-fronts or hot-spots are detected when hydrogen-rich recycle gas is subsequently introduced. In this embodiment, after the hydrogen-rich recycle gas is introduced the second time and prior to pressuring up, said hydrogen-rich recycle gas is again passed through the bed for a period in excess of about 1 minute at a gas flow rate of about 1–25, preferably about 4–20, standard cubic feet per hour per pound of catalyst. Thereafter, the reactor is again purged with quench gas. At such time as no significant heat fronts or hot-spots occur, e.g., no heat-front temperatures in excess of about 950–1000° F. within about 30 minutes after introducing hydrogen-rich-recycle gas, the reactor may be safely brought on stream by pressuring up and introducing naphtha, preferably as rapidly as possible.

We prefer to carry out our purging with hydrogen-rich recycle for a period in excess of about one minte, i.e., about 1 minute to 1 hour, preferably about 3 to 30 minutes, optimally about 15 minutes. Such period is normally adequate for initiating potential hot spots or heat fronts, which may then be quenched before temperatures reach damaging levels. The presence of substantial hot-spots or heat-fronts is conveniently detected by means of thermocouples in the catalyst bed and/or by changes in recycle gas composition as the result of passing through the catalyst bed, e.g., an increase in methane and decrease in hydrogen.

For our quench step the catalyst should be treated with sufficient hydrocracking-resistant gas, at a minimum, to displace all of the hydrogen-rich recycle gas. The hydrogen-rich recycle gas, of course, contains substantial hydrocarbons capable of hydrocracking at reforming conditions. The quench step is preferably once-through to removed simultaneously any contaminants. Temperature of the quench gas should not exceed that of the heat front and preferably should be below that of the heat-front, so that some cooling of the heat-front may occur, e.g., to a temperature below about 900° F. Extreme temperature differentials should, however, be avoided to prevent thermal shock. Treating pressure is preferably atmospheric although higher or lower pressures may be used. Examples of hydrocracking-resistant gases for use in our invention are nitrogen, substantially hydrocarbon-free hydrogen, and substantially hydrogen-free normally-gaseous hydrocarbons, e.g., natural gas, ethane, and propane. In no event should mixtures of hydrogen and hydrocarbons, other than methane, be present at the same time during our quench step. The gas should also be substantially free of substances deleterious to the catalytic properties of platinum, e.g., excess water, carbon monoxide, arsenic, lead, and the like. Flue gas has been found to be unsuitable because it usually contains carbon monoxide which poisons platinum catalyst, and/or because the repeated contact of hydrogen and carbon dioxide (in flue gas) over platinum catalyst results in the formation of carbon monoxide and/or methane and water.

Following final treatment of the catalyst with quench gas, hydrogen-rich recycle gas is again introduced at about the same pressure, e.g., atmospheric pressure, to purge the quench gas. Temperature of the introduced recycle gas is normally reforming temperature, e.g., 800–1000° F. The reactor is then pressured up to reforming pressure, e.g., about 50–1000 pounds per square inch gage, with the recycle gas. Upon reaching reforming pressure naphtha vapors are introduced. With the regenerated reactor on-stream, another reactor may be removed, if desired, for regeneration.

Without our special procedure as above described, heat-fronts may be formed and, when formed, usually pass through the catalyst bed at the rate of between 0.05 and 0.5 inch per second in the direction of recycle gas and naphtha flow. They may raise catalyst temperature to levels in excess of 1200–1300° F. The particular extent of coke formation resulting from heat-fronts depends on many variables, including the severity of the hot-spot, recycle gas rate, composition of the recycle gas, type of naptha, initial activity of the catalyst, and the like. For instance, in one series of tests with a platinum-alumina catalyst containing 0.6 weight percent platinum with a Mid-Continent naphtha at a recycle gas rate of 4000 cubic feet per barrel, naphtha heat-fronts deposited coke on the catalyst to the extent of 0.02 weight percent coke for each 10° F. of temperature rise.

It has been observed that heat-fronts are usually encountered only for a short period after recycle gas and/or naphtha are introduced at reforming conditions. They are also usually encountered only with new platinum catalyst or used platinum catalyst which are in a highly active state. Thus with a slightly deactivated catalyst, the heat-front may be encountered after a simple carbon burnoff. With a substantially deactivated platinum catalyst the heat-front may be encountered only after substantial reactivation by such a technique as the regeneration-rejuvenation technique used in Ultraforming. Heat-front formation may be particularly pronounced if the platinum catalyst has been contacted with a halogen or halogen-affording compound. In the normal start-up of platinum catalyst reformers heat-fronts are usually not considered a problem because the platinum catalyst is normally contacted with hydrogen and hydrocarbons at a temperature substantially below reforming temperature, e.g. below about 800° F.

The exact mechanism in which our invention solves the problem of recycle gas and naphtha heat-fronts is not fully understood. Our quench step with hydrocracking-resistant gas obviously prevents continuation of any hydrocracking reaction and usually results in some cooling of the catalyst. When recycle gas is again introduced, however, any hydrocracking reaction would be expected to continue. Surprisingly, we have found that whatever the cause of any particular hot-spot or heat-front, it has been substantially eliminated. Moreover, this unexpected result cannot be explained merely in terms of our quench gas carrying away heat developed at the heat-front. We have found that even if substantially no more quench gas is used than that required to displace hydrogen-rich recycle gas—and thus the quench gas would not have sufficient heat capacity—our method still copes with the problem of damaging heat-fronts.

One possible explanation may be that our technique effectively renders that portion of the catalyst, where hot-spots or heat-fronts have occurred, immune to further hot-spots or heat-fronts, i.e., inactivated to hydrocracking at the same temperature. Our quench step may require repetition, not because of failure to cope with the problem, but because other down-stream points or positions in the bed, which have not been previously contacted in the manner of our invention, may develop hot-spots or heat-fronts. Such down-stream points or positions may have previously been shielded from contact with hydrogen-rich recycle gas and/or quench gas by channeling and/or by prior conversion, i.e., cracking of the recycle gas. Injection of hydrogen-rich recycle gas and/or quench gas at multiple points in the catalyst bed may alleviate this situation and obviate the need for repetition of our technique. The above explanation, however, is advanced as one possibility only, and we do not necessarily wish to be bound or limited thereby.

The invention will be more clearly understood by references to the following example read in conjunction with the accompanying drawing which is a schematic flow diagram of an Ultraforming system in which our procedure for bringing a reactor on-stream is particularly advantageous.

In normal operation of an Ultraforming system a naphtha charge such, for example, as the 150 to 360° F. fraction of Mid-Continent virgin naphtha, which may or may not be hydrodesulfurized, is introduced from source 7 by pump 8 through preheater 9 and transfer line 10 from which the preheater charge may be by-passed by line 11 to the product recovery system during start-up procedure. In on-stream operation transfer line 10 will discharge through lines 12 and 13 to reactor 14 along with hydrogen-rich recycle gas from line 15 which is preheated in heater 16. Effluent from reactor 14 passes through line 17, reheater 18 and transfer line 19 to reactor 20. Effluent from reactor 20 passes through line 21, reheater 22 and transfer line 23 to tail reactor 24. It should be understood that more than three reheater-reactor stages may be employed in the system.

Effluent from the tail reactor flows through lines 25 and 25c, heat exchanger 26, and cooler 27 to separator 28 from which hydroformed product is withdrawn through line 29 to a stabilizer and/or conventional product recovery system. A part of the hydrogen-rich gas withdrawn from the separator through line 30 may be vented through line 31, but usually about 1,000 to 10,000 cubic feet per barrel of charge is recycled through line 32 by means of circulating compressor 33 to line 15.

Transfer lines 11a, 13a, 19a and 23a may be selectively connected to header 34 for discharging through line 35 to swing reactor 36, the effluent from which passes through line 37 to header 38 and thence through line 17a to line 17, line 21a to line 21, or line 25a to line 25. During normal on-stream operation without the swing reactor the valves in lines 11, 11a, 13a, 13b, 17a, 17b, 19a, 19b, 21a, 21b, 23a, 23b, 25a, and 25b remain closed and the valves in lines 12, 13, 17, 19, 21, 23 and 25 remain open.

The swing reactor may be substituted for the lead reactor by opening valves in lines 13a, 35, 37 and 17a and closing valves in lines 13 and 17. Alternatively, it may be substituted for intermediate reactor 20 by opening valves in lines 19a, 35, 37 and 21a and closing valves in lines 19 and 21. The swing reactor may take the place of the tail reactor by opening valves in lines 23a, 35, 37 and 25a and closing valves in lines 23 and 25. It will thus be seen that each of the reactors may be taken off-stream for regeneration and replaced by the swing reactor and that, alternatively, the swing reactor may be connected to operate in parallel with any of the other on-stream reactors during periods when no regeneration is required.

In some Ultraforming systems the hydrogen-rich recycle gas and the naphtha charge are heated in the same preheater. In such systems the charge introduced by pump 8 may be introduced by lines 8a and 8b to line 15 just ahead of heat exchanger 26 during normal operation and may be introduced by line 8a and line 8c to the line entering separator 28 during start-up.

Each of the reactors is provided with a refractory lining of low iron content, and metal surfaces may preferably be aluminized. They may each contain about the same amount of catalyst although, if desired, the subsequent reactors may contain somewhat more catalyst than the initial reactors. The catalyst may be of any known type of supported platinum catalyst, and the platinum is preferably supported on alumina; it may be prepared by compositing a platinum chloride with an alumina support as described, for example, in U. S. Patent 2,659,701, and it preferably contains about .3 to .6 weight percent of platinum.

The on-stream pressure is usually below about 400 pounds per square inch gage, e.g., in the range of 200 to 350 pounds per square inch gage. The inlet temperatures to each reactor are usually in the range of about 800 to 1000° F., e.g., about 920° F., and may be approximately the same for each reactor although it is sometimes desirable to employ somewhat lower inlet temperature to the initial reactor than to the remaining reactors. The overall weight space velocity may be in the range of about 0.5 to 5 pounds of naphtha per pound of catalyst per hour. There is, of course, a pressure drop in the system so that the lead reactor may operate at about 50 to 100 pounds per square inch higher pressure than the tail reactor.

Prior to regeneration hot hydrogen-rich gas for stripping hydrocarbons from catalyst in a blocked-out reactor may be introduced by line 63 to manifold line 40 and thence through one of lines 13b, 19b, 23b, or 35b to the selected reactor. Also, if desired, hydrogen-rich gas may be introduced from line 15 to manifold line 39 by line 64 and thence through one of lines 17b, 21b, 25b, or 37b to the selected reactor.

For effecting purging and/or regeneration of the catalyst in any bed, purge gases and/or regeneration gases may be introduced either through manifold line 39 and a selected one of lines 17b, 21b, 25b and 37b or through manifold line 40 and a selected one of lines 13b, 19b, 23b, or 35b. Such purge and regeneration gases may be selectively withdrawn through corresponding lines at the top or bottom of the reactor, as the case may be, to the appropriate manifold. Gases may be vented or flared from manifold line 39 via line 57, which is equipped with pressure-controlled valve 58. Correspondingly, gases may be vented or flared from manifold line 40 by similar means (not shown).

Flue gas from source 42 may be introduced to the system by compressor 43 and passed by lines 44 and 45 through a drying chamber 46 which is preferably a scrubbing tower into which cool water is introduced through line 47 and from which water is withdrawn through line 48. The scrubbed flue gas withdrawn from the top of the tower through line 49 is passed by compressor 50 through line 51, heat exchanger 52, and heater 53 either to line 54 and manifold line 39 or to lines 55, 56 and manifold 40, when it is desired to introduce flue gas into the system for purging and/or regeneration. By closing the valve in line 54 and opening the valves in line 55 and the lower part of line 56, the flue gas may be recirculated through line 56, heat exchanger 52 and line 45 back to the scrubber. Air may be introduced from source 60 by compressor 61 for effecting regeneration and/or regeneration-rejuvenation of the catalyst. Rejuvenation is an additional oxidative treatment after the regenerative coke burn. During regeneration excess flue gas may be vented from the system by line 62. Air and/or flue gas from manifold line 39 may be introduced to the inlet of circulating compressor 33 by line 59. Methane, conveniently in the form of natural gas, may be introduced from source 41 to manifold line 40 for purposes of our invention.

One unique characteristic of the Ultraforming process, in contrast with non-regenerative platinum reforming processes, is the fact that an Ultraformer can be started up without use of extraneous hydrogen. Such a startup procedure is described in co-pending application S.N. 502,604, filed April 20, 1955, issued as U. S. Patent No. 2,910,430.

The method of effecting catalyst regeneration will be described as applied to the swing reactor but it will be understood that the same procedure may be employed for any one of the other reactors when it is blocked out. When the charge inlet valve in line 35 is closed and while the valve in line 37 remains open, hot hydrogen-rich gas is introduced by line 63 to manifold line 40 and thence through line 35b to strip out any hydrocarbons that may remain in the reactor, this stripped material being discharged through lines 37, 38, 25a, and 25c. Next, the valve in lines 63 and 37 are closed and reactor 36 is depressured by opening the valve in line 37b and valve 58 in line 57. Next, the reactor is purged to eliminate hydrogen-rich gas therefrom either by introducing flue gas from line 55 via lines 56, 40, and 35b, the purge gases being vented through lines 37b, 39, and 57. After the flue gas purge, valve 58 in line 57 is closed and introduction of flue gas from source 42 is continued to pressure the reactor with flue gas to approximately the same pressure as that employed in on-stream processing, i.e., about 300 pounds per square inch gage. The temperature of the catalyst bed is adjusted to about 650 to 750° F. preparatory to initiating regeneration by circulating flue gas, under such pressure, upflow through the reactor by means of compressor 50. The circulating flue gas leaves and returns to swing reactor 36 via 35b, 40, 56, 52, 45, 46, 49, 50, 51, 52, 53, 54, 39, and 37b, the appropriate valves being open or closed as the case may be. Heat may be supplied to the circulating gas heater by 53, if necessary.

Next, controlled amounts of air are introduced from source 60 by compressor 61 into the circulating flue gas stream at a rate to effect combustion of carbonaceous deposits without exceeding a combustion zone temperature of about 1050° F. The hot flue gas leaving the reactor at about this temperature passes by lines 35b, 40 and 56 through heat exchanger 52 and thence through line 45 to scrubber 46 wherein the gas is scrubbed with cool water for condensing and eliminating most of the water formed by combustion of hydrocarbonaceous deposits. The net amount of flue gas production is vented from the system through line 62, the valve in which is set to maintain the desired back pressure of about 300 pounds per square inch gage. The cooled flue gas which is recirculated by compressor 50 may be further dried by passing through a desiccant bed (not shown) before it is returned through heat exchanger 52 to heater 53 which, during regeneration, maintains a transfer line temperature of approximately 700° F.

After the carbon deposits are removed, the transfer line temperature of heater 53 is increased to about 950° F. in order to reheat the catalyst bed to that temperature. If rejuvenation is required the introduction of flue gas is stopped and the introduction of air is continued so that the catalyst is treated with a circulating air stream at a pressure of about 100 to 350 pounds per square inch gage and a temperature of about 950° F. to 1100° F. for a period of about one-half hour to twelve hours or more depending upon the extent of rejuvenation required.

After the regeneration (or after rejuvenation if rejuvenation has been effected) the introduction of air is stopped, and flue gas is circulated to adjust catalyst bed temperature. Simultaneously, additional flue gas is introduced from source 42 to displace oxygen from the swing reactor and from the regeneration system. Part of the circulating gases is vented via line 57 at about the same rate as flue gas is added, thereby maintaining pressure substantially constant. After oxygen content is reduced below at least about 1 mol percent, the valves in lines 54 and 56 are closed and the introduction of flue gas is stopped. The swing reactor is then depressured by slowly opening the valve 58 in line 57. After depressuring, the valve in line 56 is again opened and swing reactor 36 is again purged at about atmospheric pressure with flue gas to remove all residal oxygen, after which valve in line 56 is again closed.

After removal of all oxygen, the system is purged, in accordance with our invention, at about atmospheric pressure with hydrogen-rich recycle gas from line 15, which is introduced through lines 63, 40 and 35b by opening the valve in line 63. The purge is continued for a period in excess of about 1 minute, e.g., about 15 minutes, at a gas flow rate of about 1 to 25, preferably about 4–20, standard cubic feet of gas per hour per pound of catalyst in swing reactor 36. The purge gases leave swing reactor 36 via lines 37b, 39 and 57 and are preferably vented. The valve in line 63 is then closed and methane, preferably in the form of hydrogen-free natural gas and at a temperature substantially below that of any point in the catalyst bed, is introduced from source 41 via lines 40 and 35b to swing reactor 36, the displaced gases being vented from swing reactor 36 via lines 37b, 39, and 57. The introduction of methane is continued until, at least, all hydrogen is removed from swing reactor 36. The methane purge may preferably be continued for a longer period of time to remove deleterious substances from the catalyst, e.g., water, although too long a purge period may reduce catalyst bed temperature substantially below reforming temperature and thus may require additional reheating, particularly if the introduced methane is at ambient temperature.

After the methane purge, the methane is displaced with hydrogen-rich recycle gas introduced by opening valve in line 63. If further hot-spots are detected, e.g., by the thermocouples in the catalyst bed, the introduction of methane is repeated as hereinabove described. If no further heat-fronts or hot-spots are detected, valve 58 in line 57 is then set to hold back reforming pressure, i.e., 300 pounds per square inch gage, and a system is pressured up with hydrogen-rich recycle gas. When the reactor is thus brought to desired operating pressure, the valves in lines 63, 35b and 37b are closed, and the reactor may be placed on-stream by opening valves in lines 35 and 37.

Because of our carefully controlled procedure for initially introducing hydrogen-rich recycle gas and our quench step, as hereinabove described, no damaging heat-fronts are encountered at any time when returning reactors, after reactivation, to on-stream operation at reforming temperatures. Without our technique, temperatures would have to be lowered substantially below reforming temperatures to minimize the damage from the consequent heat-fronts. Lowering temperature, of course, involves additional expense and substantially prolongs the reactivation cycle.

While our invention has been described herein as applied to bringing the swing reactor of an Ultraforming unit on-stream while other reactors in the system are already on-stream, it should be understood that it is equally applicable to each of the other reactors when bringing said reactors on-stream. Our invention has also been described as applied to a freshly-regenerated-rejuvenated catalyst. It should be understood, of course, that it is also applicable to new platinum catalysts which are contacted simultaneously with hydrogen and hydrocarbons at reforming conditions. While our invention has been described as applied to a particular Ultraforming system, various alternative processing arrangements and operating conditions will be apparent in the above description to those skilled in the art.

Having thus described the invention, we claim:

1. In a platinum-catalyst naphtha reforming system including lead, intermediate, and tail reactors, heating zones, a gas separation zone, a compressor and lines for recycling hydrogen-rich separated gas, the method of bringing a reactor containing new or regenerated platinum catalyst on-stream at reforming temperatures which comprises purging said reactor with flue gas to remove oxygen therefrom, purging said reactor with said hydrogen-rich separated gas at about atmospheric pressure whereby a heat-front may be initiated in the platinum catalyst, purging said reactor with a hydrocracking-resistant gas whereby said heat-front is quenched, again introducing said hydrogen-rich separated gas into said reactor, and introducing naphtha vapors therein.

2. The method of claim 1 including the step of repeating the purging with said hydrogen-rich separated gas and said hydrocracking-resistant gas until no substantial heat-fronts are detected.

3. The method of claim 1 wherein said hydrocracking-resistant gas is hydrocarbon-free hydrogen.

4. The method of claim 1 wherein said hydrocracking-resistant gas is hydrogen-free natural gas.

5. In a regenerative platinum-catalyst naphtha reforming system containing a plurality of reactors in which platinum catalyst in any of said reactors is substantially reactivated off-stream in the presence of oxygen-containing gases while naphtha is being reformed in the remaining of said reactors in the presence of hydrogen-rich recycle gas, the method of returning an off-stream reactor after regeneration to reforming operation which method comprises purging said off-stream reactor with flue gas to remove oxygen therefrom and to adjust temperature of the platinum catalyst therein to about 800–1000° F., purging said off-stream reactor at about atmospheric pressure with said hydrogen-rich recycle gas for a period of about 3 to 30 minutes at a gas flow rate of about 1 to 25 standard cubic feet per hour per pound of said platinum catalyst whereby hot-spots are initiated in said platinum catalyst, thereafter displacing said hydrogen-rich recycle gas with a hydrocracking-resistant gas, pressuring up said reactor to reforming pressure with said hydrogen-rich recycle gas at reforming temperature, and introducing naphtha vapors therein.

6. The method of claim 5 wherein said hydrocracking-resistant gas is methane.

7. The method of claim 5 including the step of repeating the steps of purging said off-stream reactor with said hydrogen-rich recycle gas and of displacing said hydrogen-rich recycle gas with said hydrocracking-resistant gas until no substantial hot-spots are initiated.

8. In a regenerative platinum catalyst naphtha reforming system containing a plurality of reactors in which platinum catalyst in any of said reactors may be reactivated off-stream in the presence of oxygen-containing gases while naphtha is being reformed in the remaining of said reactors in the presence of hydrogen-rich recycle gas, the method of preparing an off-stream reactor after reactivation for on-stream operation which method comprises purging said off-stream reactor with flue gas to remove oxygen therefrom, purging said off-stream reactor with said hydrogen-rich recycle gas at atmospheric pressure for a period of about 15 minutes at a flow rate of about 4–20 standard cubic feet per hour per pound of platinum catalyst, thereafter purging said hydrogen-rich recycle gas from said reactor with natural gas, repressuring said reactor to reforming pressure with said hydrogen-rich recycle gas at reforming temperature, and introducing naphtha vapors therein at reforming temperature.

9. In the method of returning a reactor of regenerated platinum catalyst to on-stream operation at reforming temperatures in a multiple-reactor system in which hydrogen-rich gas is recycled, which method comprises purging said reactor with flue gas to remove oxygen therefrom and then purging said reactor with said hydrogen-rich gas at about atmospheric pressure prior to pressuring up with said hydrogen-rich gas and introducing naphtha vapors therein at reforming temperature, the improvement which comprises continuing the atmospheric purge with said hydrogen-rich gas for about 3 to 30 minutes at a gas rate of about 1 to 25 standard cubic feet per hour per pound of catalyst and then displacing said hydrogen-rich gas with natural gas, prior to pressuring up with said hydrogen-rich gas and introducing naphtha.

References Cited in the file of this patent

UNITED STATES PATENTS

| | | |
|---|---|---|
| 2,743,215 | Riblett et al. | Apr. 24, 1956 |
| 2,773,013 | Wolf et al. | Dec. 4, 1956 |
| 2,773,014 | Snuggs et al. | Dec. 4, 1956 |
| 2,880,161 | Moore et al. | Mar. 31, 1959 |
| 2,880,162 | Moore | Mar. 31, 1959 |